(12) United States Patent
Fuge et al.

(10) Patent No.: US 7,689,379 B2
(45) Date of Patent: Mar. 30, 2010

(54) METHOD OF DETERMINING MEASUREMENT PROBE ORIENTATION

(75) Inventors: Jonathan Paul Fuge, Bristol (GB); Michael John Wooldridge, Stroud (GB); Jamie John Buckingham, Berkeley (GB); Peter Kenneth Hellier, North Nibley (GB)

(73) Assignee: Renishaw PLC, Wotton-Under-Edge (GB)

( * ) Notice: Subject to any disclaimer, the term of this patent is extended or adjusted under 35 U.S.C. 154(b) by 182 days.

(21) Appl. No.: 11/921,521

(22) PCT Filed: Jun. 15, 2006

(86) PCT No.: PCT/GB2006/002184

§ 371 (c)(1),
(2), (4) Date: Dec. 4, 2007

(87) PCT Pub. No.: WO2006/134360

PCT Pub. Date: Dec. 21, 2006

(65) Prior Publication Data

US 2009/0099803 A1     Apr. 16, 2009

(30) Foreign Application Priority Data

Jun. 15, 2005 (GB) ................................ 0512138.9

(51) Int. Cl.
*G01C 9/00* (2006.01)
*G01B 7/08* (2006.01)

(52) U.S. Cl. ............................ 702/150; 33/504; 33/561; 702/152

(58) Field of Classification Search ................... 702/56, 702/87, 95, 141, 150, 152, 153, 167; 33/504, 33/559, 561; 73/105, 634, 651, 661
See application file for complete search history.

(56) References Cited

U.S. PATENT DOCUMENTS

| | | | |
|---|---|---|---|
| 4,333,238 A | | 6/1982 | McMurtry |
| 4,882,848 A | | 11/1989 | Breyer et al. |
| 4,937,948 A | | 7/1990 | Herzog et al. |
| 5,138,563 A | | 8/1992 | Debitsch et al. |
| 5,671,542 A | * | 9/1997 | Zannis et al. ................. 33/561 |
| 5,724,264 A | * | 3/1998 | Rosenberg et al. .......... 702/152 |
| 6,360,176 B1 | * | 3/2002 | Nishioki et al. ............... 702/56 |
| 6,370,789 B1 | | 4/2002 | Madlener et al. |

FOREIGN PATENT DOCUMENTS

| | | |
|---|---|---|
| GB | 2 070 249 A | 9/1981 |
| WO | WO 2006/100508 A1 | 9/2006 |
| WO | WO 2006/120403 A1 | 11/2006 |

* cited by examiner

*Primary Examiner*—John H Le
(74) *Attorney, Agent, or Firm*—Oliff & Berridge, PLC

(57) ABSTRACT

A dimensional measurement probe (10) is mounted in a machine tool (48), which reorientates the probe about at least one axis A. Strain gauges (34) sense when a stylus (20) of the probe contacts a workpiece (50), to produce a trigger signal. False trigger signals may be produced when the probe is reorientated. To overcome this, the reorientation is detected by monitoring changes in the fluctuations of the strain gauge outputs, caused by vibrations of the stylus.

16 Claims, 4 Drawing Sheets

METHOD OF DETERMINING MEASUREMENT PROBE ORIENTATION

The present invention relates to the operation of a dimensional measurement probe.

Typically a measurement probe has a body housing a displacement or force sensor and an elongate stylus co-operating with the sensor having an enlarged end for "feeling" a workpiece in order to determine its dimensions. Such probes are used in conjunction with machines which have a coordinate determination system e.g. coordinate measurement machines, machine tools or robotic devices.

One type of such probe is arranged to generate a trigger signal when the stylus contacts a workpiece and the output of the sensor exceeds a threshold. The trigger signal is used to freeze the output of the coordinate determination system, in order determine the position of the contact point.

In order to make the probe accurate the sensor is made very sensitive. However, this causes problems when vibration occurs. The vibration is sensed as a so-called "false trigger", as if it were a workpiece contact, when in fact no contact has been made. Such false triggers are overcome by filtering the output of the sensor. However, the filtering reduces the frequency response of the sensor.

Additionally, the present inventors have discovered a further problem, as follows. If such a sensitive probe is reoriented in use, e.g. from a vertical orientation to a horizontal orientation, then the stylus and the sensor will be subject to a side-load caused by gravitational pull. This may cause the probe to remain permanently in a false triggered state, or it may cause regular false triggers if vibration is present during or after probe reorientation.

The present invention provides a dimensional measurement probe, the probe being mountable to a machine which reorientates the probe about at least one axis, the probe comprising:

a stylus for contacting an object;

a stylus contact sensor connected to the stylus and producing a signal when the stylus contacts the object;

a processor for processing the signal from the sensor and producing an output for measurement of the object as a result of such contact;

said signal being subject to a change caused by reorientation of the probe about said axis; and means for determining when such reorientation has taken place.

Preferably, the means for determining reorientation comprises said processor, which operates to monitor said change in the signal caused by reorientation, and to determine therefrom when such reorientation has taken place. However, the means for determining reorientation may instead comprise a separate orientation sensor.

The signal may include fluctuations caused by vibrations of the stylus, and in a preferred embodiment the processor monitors a change in the fluctuations in order to determine the reorientation.

More preferably the monitoring includes monitoring changes in the frequency of the fluctuations and/or the level of the fluctuations.

Embodiments of the invention will now be described by way of example, with reference to the accompanying drawings, wherein.

Figure 1A:
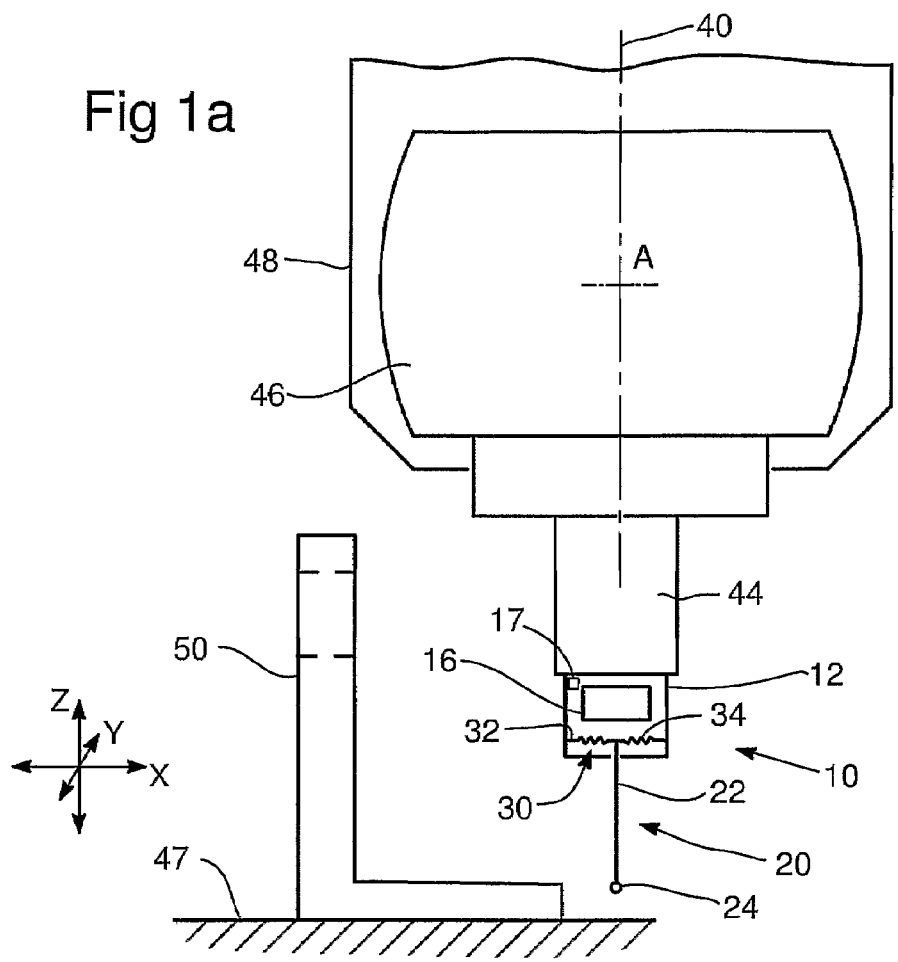
FIGS. 1a and 1b show a probe according to the invention which is mounted to a machine tool in different orientations.

In FIG. 1a a measurement probe 10 is shown which has a body 12 attached to the spindle 44 of a machine tool 48. The spindle 44 is attached to a head 46 which can pivot in use, about axis A on machine tool 48.

The probe has a stylus 20 having a stem 22 terminated by a stylus tip 24 for contacting an object, in this case a workpiece 50 mounted to the bed 47 of machine tool 48. The stem extends along an axis 40 and is connected to the body 12 via a strain sensor 30. It is preferably connected to the sensor 30 via a set of seating elements (not shown) which engage kinematically in a repeatable rest position, and which disengage when the stylus contacts the workpiece to allow the stylus to deflect and prevent damage. Full details of these kinematic seating elements, and of the rest of the probe, are described in previous International Patent Applications Nos. PCT/GB2006/001095 and PCT/GB2006/001654, both of which are incorporated herein by reference. The kinematic seating elements are not essential to the present invention and may be omitted or replaced by non-kinematic seating elements.

The sensor 30 comprises fairly rigid spokes 32 each having a strain gauge 34 attached thereto for sensing strain in each spoke. Such strain results from the forces which act, e.g. when contact is made between the workpiece 50 and the stylus tip 24. In this embodiment there are three spokes and strain gauges arranged to extend radially outwardly from the stylus to the body at 120° to each other.

In use the probe 10 is moved relative to the workpiece 50 in directions X,Y and Z. Various contacts between stylus tip 24 and workpiece 50 are made in order to determine the size of the workpiece 50. When a contact is made, strain is exerted on the sensor 30. The outputs of the strain gauges 34 (in the form of varying voltages caused by resistance changes) are processed by a processor 16. A trigger signal is issued from the processor 16 when the strain gauge outputs, which is used to record the machine tool's position in order to determine the dimensions of the workpiece 50.

While the processor 16 is preferably provided within the probe body, as shown, it may instead be provided in an external interface. As described in the above-mentioned earlier international patent applications, the processor 16 may comprise analogue or digital electronic circuitry, e.g. included in an application-specific integrated circuit (ASIC). Alternatively it may comprise a digital arithmetic unit or other programmable device, suitably programmed to provide the functionality required.

Figure 1B:
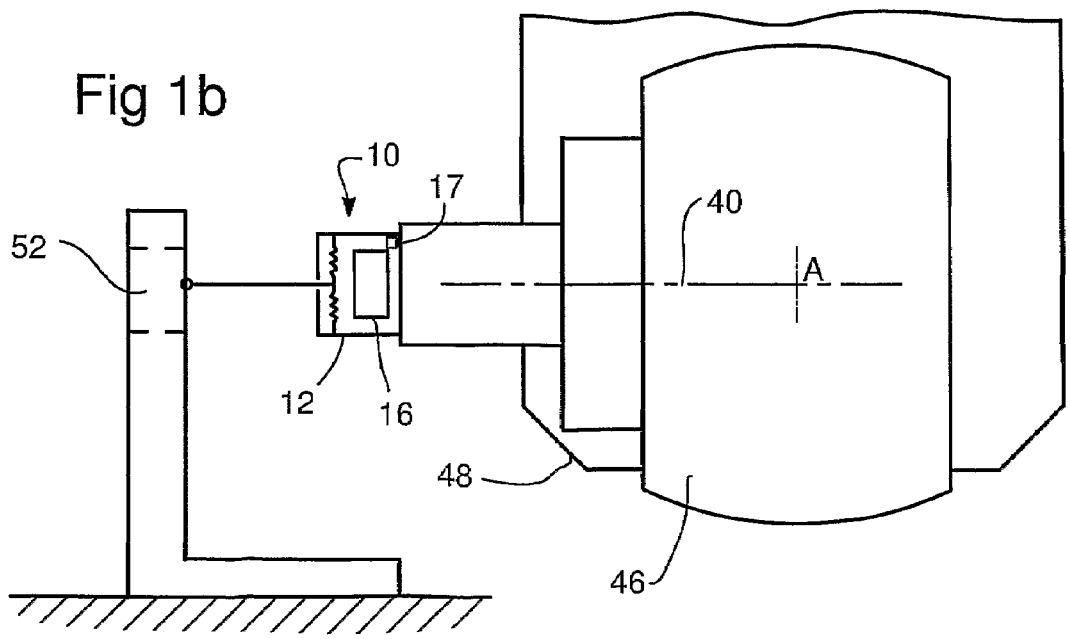

During checking of the workpiece it may be desirable to reorient the probe e.g. from the positions shown in FIG. 1a to the position shown in FIG. 1b in order to reach otherwise inaccessible features, e.g. bore 52.

Vibrations will be present in the machine tool head as reorientation takes place e.g. as a result of the impulse due to a change in stylus velocity, motor operations or other ancillary functions. The vibrations have been found by the inventors to produce a near constant frequency oscillation in the sensor 30. This is manifested in this embodiment as a constant frequency signal from the strain gauges 34.

Figure 2A:
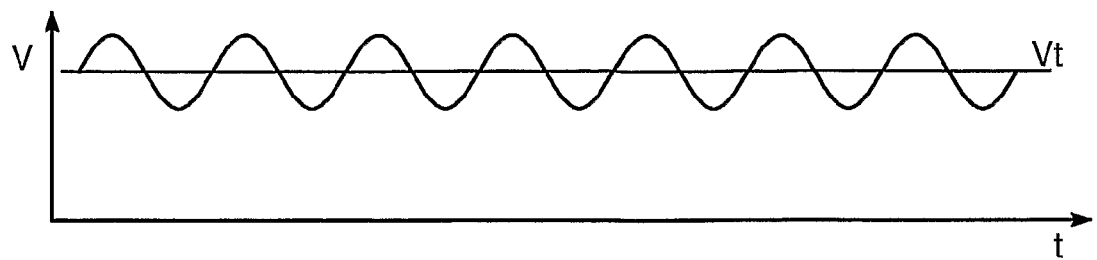
FIGS. 2,3 and 4 show outputs from the force sensors of the probe shown in FIG. 1.
Figure 2B:
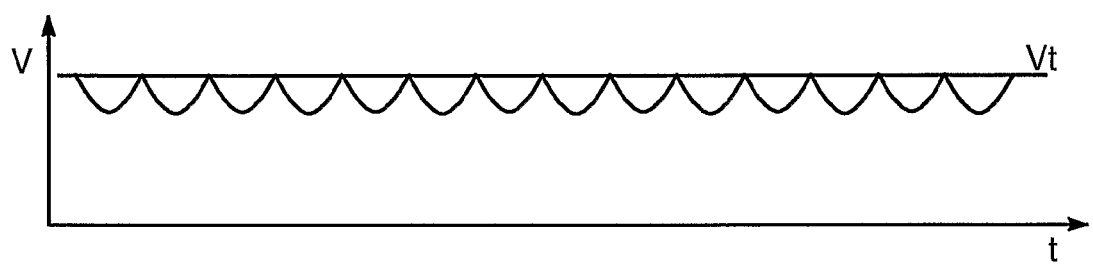

FIG. 2a shows an output of one strain gauge 34. Signals from the other two strain gauges will be similar. It is possible to rectify this signal about a nominal voltage level Vt. Such a rectified signal is shown in FIG. 2b.

Side forces act on the stylus as the probe accelerates or retards. Additionally gravitational forces act on the stylus as it reorientates e.g. from the position shown in FIG. 1a (0°) to the position shown in FIG. 1b (90°).

Figure 3A:
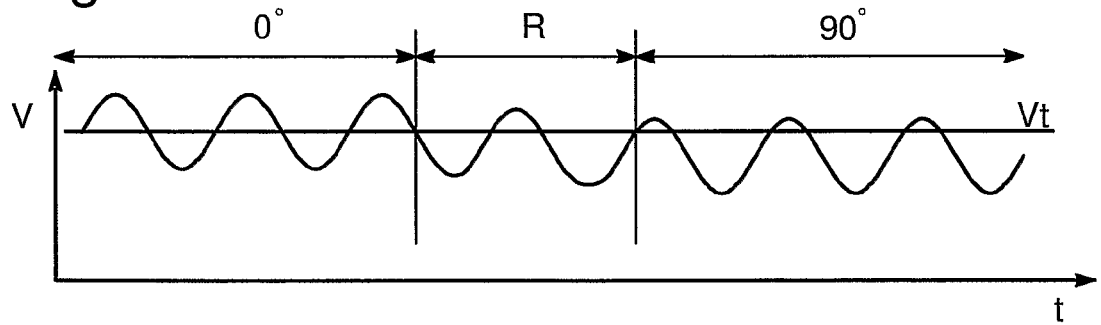

FIG. 3a shows the resulting signal from the strain gauge as the probe moves from 0° (as shown in FIG. 1a) to 90° (as shown in FIG. 1b). The frequency does not change but the mean position of the signal moves during the reorientation, as shown in the region R.

Figure 3B:
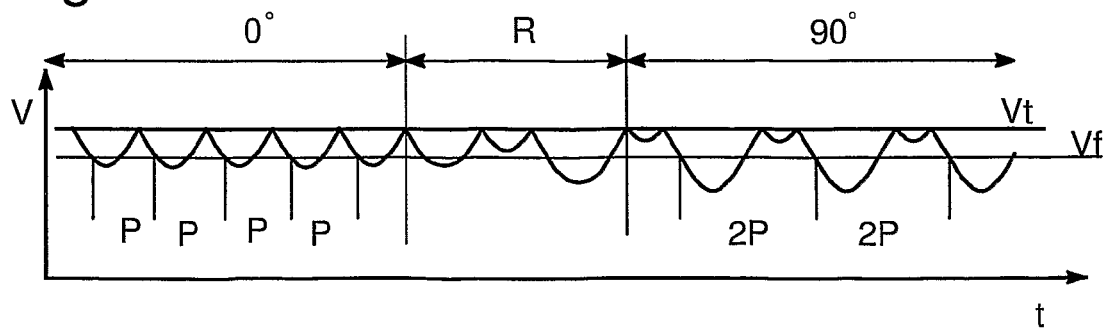

FIG. 3b shows the signal of FIG. 3a rectified about a level Vt. It can be seen that the period of the signal at the crossing points with a lower level Vf changes from P to 2P in the region R as the probe reorients from 0 to 90°. Thus if the period of the strain gauge signal at Vf is monitored it will be apparent that this period is doubled as reorientation takes place i.e. the frequency is apparently halved.

Figure 5:
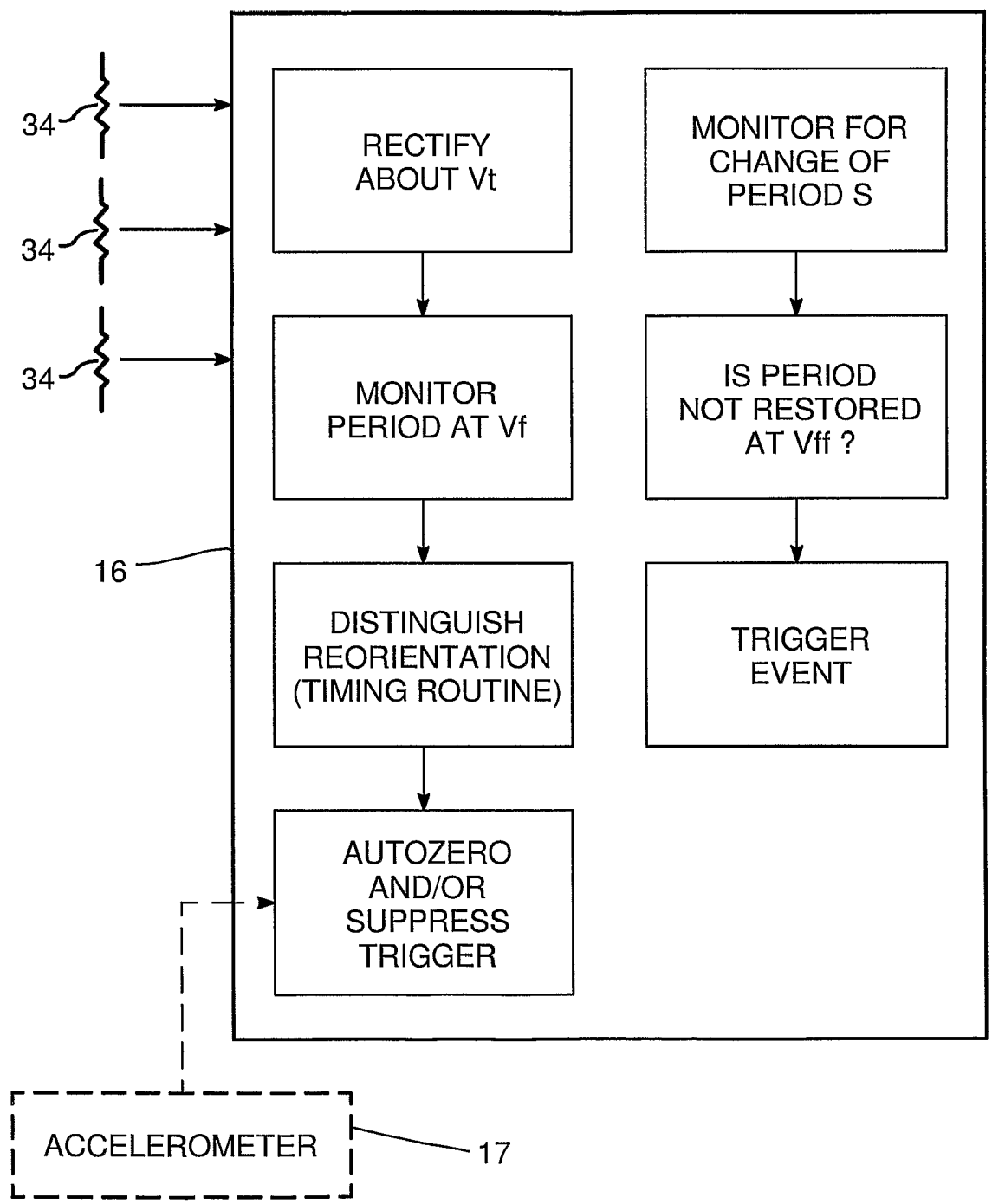
FIG. 5 illustrates diagrammatically the operation of a processor of the probe.

As shown in FIG. 5, therefore, the processor 16 is programmed (or otherwise arranged) firstly to rectify the signal about Vt, and then to monitor the period of the vibrations at Vf. If the period changes e.g. doubles, then an indication of reorientation is produced. Such a reorientation can be distinguished from a side-load due to translational movement e.g. acceleration or retardation, of the head in X and Y directions because the reorientation loading will be prolonged. Thus, the processor includes a timing routine or circuit to distinguish this. Short fluctuations can thus be disregarded as probe translation without reorientation.

When reorientation has been detected by processor 16, known autozeroing techniques can be used to make the new nominal position of the stylus the mid-point for workpiece contact purposes. The trigger output of the processor can be suppressed, to prevent false trigger signals caused by the reorientation.

Genuine probe trigger events (i.e. contact with the workpiece) also cause loading on the strain gauges with some vibration. However, the change in loading caused by stylus to workpiece contact takes place far more quickly than the change caused by translational acceleration or retardation or reorientation. Consequently, workpiece contact signals are not confused with other signals by the processor 16 because changes occur far more rapidly.

Workpiece contact signals can be further distinguished from reorientation of the probe in the following manner, which is also illustrated in FIG. 5.

Figure 4A:
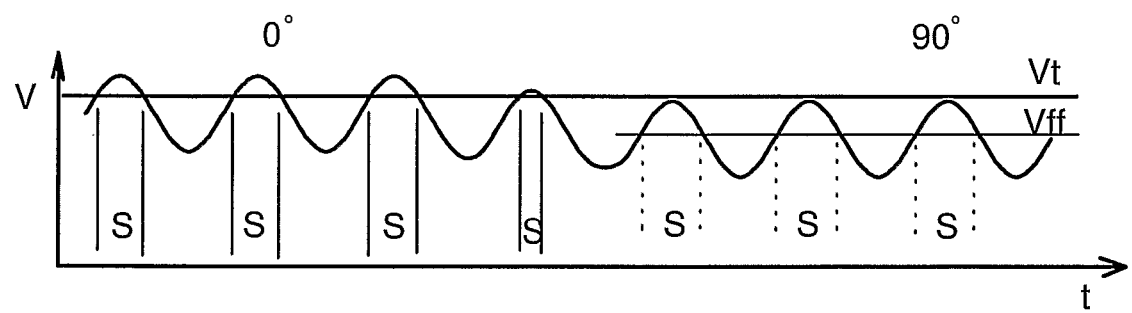

FIG. 4a shows the output from a strain gauge when reorientation takes place (similar to the occurrence illustrated in FIG. 3a). Additionally the period S, which is the time taken for successive crossings of Vt in different directions, is monitored. This period can be predicted if the frequency of the output is known. When an event occurs, in this instance a reorientation, the period S drops to zero because the signal peak drops below Vt. The period may reduce or increase also. Such a change indicates that something has happened to the stylus. If the period S is lost or changes substantially a new threshold (Vff in this instance) can be used. If the new threshold causes resumption of the period S then the event was not workpiece contact. Thus workpiece contact can be distinguished from a reorientation or change in velocity of the stylus.

Figure 4B:
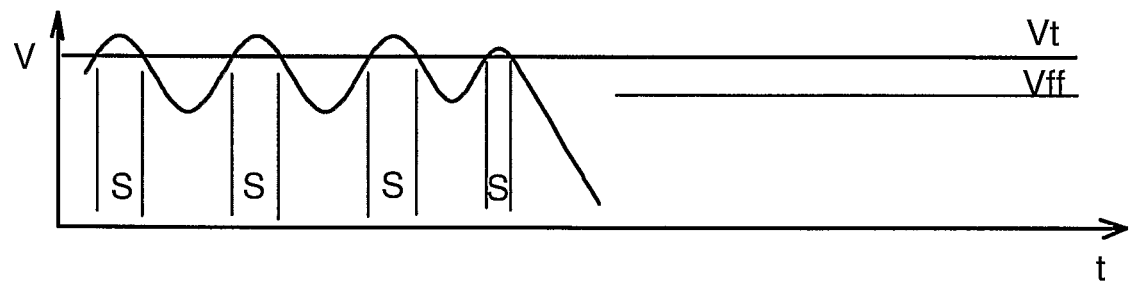

FIG. 4b shows the situation where a workpiece contact occurs. Period S reduces to zero and a threshold change to Vff does not reinstate the period. Thus, a workpiece contact is reported by the processor 16.

The above described technique has a number of advantages. When a sensitive contact sensor such as the one described above is used it is likely to produce trigger signals if vibration is present. The filtering of the gauge outputs is then necessary to stop false triggering, but this reduces the frequency response of the probe. Autozeroing techniques will be inaccurate if the probe is triggered (i.e. displaced due to work contact). For a responsive probe, regular or permanent triggering may occur as a result of reorientation preventing autozeroing taking place. Thus if the strain gauge signals are analysed as described above then a reorientation can be determined so that a trigger signal can be suppressed and autozeroing can take place.

Instead of detecting the reorientation within the processor 16 by analysing the strain gauge sensor signals, an alternative is to use a separate orientation sensor. For example, FIGS. 1a, 1b and 5 show an optional accelerometer 17 within the probe body which fulfils this function. The output of the accelerometer is taken to the processor 16, where it is used directly to control autozeroing and/or to suppress false triggers. There is then no need for the steps described in relation to FIGS. 3a and 3b.

The sensor 30 is described having sensing elements in the form of strain gauges extending radially of axis 40. However, the sensor need not use strain gauges and the sensing elements need not extend radially. For example the sensing elements could be displacement sensors like LVDTs, linear encoders or capacitance sensors. Their arrangement could be axial or any position which allows sensing of stylus contact.

The invention claimed is:

1. A dimensional measurement probe, the probe being mountable to a machine which reorientates the probe about at least one axis, the probe compnsing:
   a probe body;
   a stylus for contacting an object;
   a stylus contact sensor connected to the stylus and producing a signal when the stylus contacts the object;
   means for processing the signal from the sensor and producing an output for measurement of the object as a result of such contact, said signal being subject to a change caused by reorientation of the probe about said at least one axis; and
   means for determining when such reorientation has taken place, wherein said means for determining when such reorientation has taken place are located within the probe body.

2. A probe according to claim 1, wherein the means for determining when such reorientation has taken place comprise means for monitoring said change in the signal caused by reorientation, and for determining therefrom when such reorientation has taken place.

3. A probe according to claim 1, wherein the signal includes fluctuations caused by vibrations of the stylus, and wherein the means for determining when such reorientation has taken place comprises a means for monitoring a change in the fluctuations in order to determine the reorientation.

4. A probe according to claim 3, wherein the means for monitoring includes means for monitoring changes in the frequency of the fluctuations.

5. A probe according to claim 3, wherein the means for monitoring includes means for monitoring changes in the level of the fluctuations.

6. A probe according to claim 1, wherein the sensor signal is autozeroed when it is determined that reorientation has taken place.

7. A probe according to claim 1, wherein a trigger signal is suppressed when it is determined that reorientation has taken place.

8. A probe according to claim 1, wherein the means for determining when such reorientation has taken place comprise means for sensing the orientation of the probe.

9. A dimensional measurement probe, the probe being mountable to a machine which reorientates the probe about at least one axis, the probe comprising:
   a probe body;

a stylus for contacting an object:

a stylus contact sensor connected to the stylus and producing a signal when the stylus contacts the object;

a processor that processes the signal from the sensor and produces an output for measurement of the object as a result of such contacts, said signal being subject to a change caused by reorientation of the probe about said at least one axis; and a reorientation detector that determines when reorientation of the probe about said at least one axis has taken place, wherein said reorientation detector comprises a separate orientation sensor located within said probe body.

10. A probe according to claim 9, wherein the orientation sensor is an accelerometer.

11. A dimensional measurement probe, the probe being mountable to a machine which reorientates the probe about at least one axis, the probe comprising:

a stylus for contacting an object;

a stylus contact sensor connected to the stylus and producing a signal when the stylus contacts the object;

a processor for processing the signal from the sensor and producing an output for measurement of the object as a result of such contact; said signal being subject to a change caused by reorientation of the probe about said axis;

wherein said processor operates to monitor said change in the signal caused by reorientation, and to determine therefrom when such reorientation has taken place.

12. A probe according to claim 11, wherein the signal includes fluctuations caused by vibrations of the stylus, and the processor monitors a change in the fluctuations in order to determine the reorientation.

13. A probe according to claim 12, wherein the monitoring includes monitoring changes in the frequency of the fluctuations.

14. A probe according to claim 12, wherein the monitoring includes monitoring changes in the level of the fluctuations.

15. A probe according to claim 11, wherein the sensor signal is autozeroed when it is determined that reorientation has taken place.

16. A probe according to claim 11, wherein a trigger signal is suppressed when it is determined that reorientation has taken place.

* * * * *